UNITED STATES PATENT OFFICE.

KARL FRIEDRICH, OF BRESLAU, GERMANY.

METHOD OF PRODUCING A COLD GLAZE FOR BUILDING MATERIALS, IN PARTICULAR CEMENT.

1,402,412. Specification of Letters Patent. Patented Jan. 3, 1922.

No Drawing. Application filed September 11, 1916. Serial No. 119,574.

(GRANTED UNDER THE PROVISIONS OF THE ACT OF MARCH 3, 1921, 41 STAT. L., 1313.)

*To all whom it may concern:*

Be it known that I, KARL FRIEDRICH, a subject of the German Emperor, residing at Breslau 9, Germany, have invented certain new and useful Improvements in a Method of Producing a Cold Glaze for Building Materials, in Particular Cement, of which the following is a statement.

It has been suggested, for producing a glazelike glossy coat on cement, mortar and the like surfaces to spray the mortar by aid of a diffuser onto the moist surfaces and to simultaneously keep the surrounding air moist until the mortar coat has gone through its first setting process. This method has, however, not proven successful in all instances. In particular, the glaze did not appear in many cases, or it disappeared again after a short while, or alkali metal compounds exude from the building materials, by which the gloss of the glaze was soon destroyed.

The present invention relates to a method of producing a cold glaze on building materials, in particular on concrete, sandstone, clay, brickwork and the like. The said method consists in providing a glaze material, which is prepared of finely sifted cement or the like without any admixture of sand and in mixing said material with a small quantity of water containing bituminous substances free from volatile oils and oxidized in the presence of alkalis, and in finally applying the mixture by spraying, painting, pouring or the like operations onto the surfaces of the building material to be glazed.

Compared with the methods heretofore disclosed the method forming the subject of the present invention affords essential advantages. Firstly the known property of the said admixture, to prevent the exuding of alkali metal compounds is utilized in the present instance (in particular when the building material consists of concrete) so that the gloss of the glaze will not be destroyed by the alkali metal compounds exuding from the building material. Furthermore, the method does away with the storing of the finished glazed articles in a moist state and with the necessity to keep the surrounding air moist, so that the articles covered with the glaze may be stored dry and in any suitable place. This, of course, means a very considerable simplification of the manufacture and a corresponding saving in cost. The method results in the further advantage that the high gloss of the glaze will appear, without fail, in all instances, so that no waste need be reckoned with, and that the said high gloss will be permanently maintained. Furthermore, the new glaze has a better appearance than former glazes, as it resembles mother-of-pearl, a result that was heretofore not obtained. Finally a further advantage of the novel method resides in the appearance of the glaze after a very short time, and furthermore the glaze, notwithstanding this considerably shorter duration of its production, is considerably stronger than glazes obtained by heretofore disclosed methods.

It is essential that the material to be glazed be not coated with an emulsion of the said admixture in water before the glaze material is applied, but that the said glaze material, which consists of finely sifted, sandfree materials, in particular cement, is mixed directly with the emulsion. Experiments with the first mentioned process have shown, that this will never be successful, as the glaze will always flake off easily from the surface coated with the emulsion.

Bituminous emulsions have already been mixed with building materials, but only with such containing sand (mortar), whereby the production of glaze, which however was not the object of such admixture, is excluded.

The new method may, for example, be performed in the following manned: First a quantity of finely sifted cement required for producing the glaze material is mixed with a suitable quantity of dyestuff or colored ground stone, and then mixed with an emulsion composed of about one part of bituminous material free from volatile oils and oxidized in the presence of alkalis and 10 parts of water, whereupon the thus obtained compound is sent again through a fine sieve and thereupon applied in known manner to the surfaces to be glazed.

I claim:

A method of producing a cold glaze consisting in mixing a finely sifted, sandfree building material with an emulsion of water containing bituminous substances free of volatile oils and oxidized in the presence of alkalis.

In testimony whereof I affix my signature in presence of two witnesses.

KARL FRIEDRICH.

Witnesses:
 Mosko Finzi,
 Ernst Katz.